US012802308B2

(12) United States Patent
Carini et al.

(10) Patent No.: US 12,802,308 B2
(45) Date of Patent: Nov. 17, 2026

(54) LOCAL WEBPAGE TEMPLATE MANAGEMENT SYSTEM AND METHOD

(71) Applicant: Lastmile Retail, Inc., Steamboat Springs, CO (US)

(72) Inventors: Michael Carini, Steamboat Springs, CO (US); Will Plaehn, Salt Lake City, UT (US); James Nash, New York, NY (US); Jia Min Kuang, Bogota, NJ (US)

(73) Assignee: LASTMILE RETAIL, INC., Steamboat Springs, CO (US)

( * ) Notice: Subject to any disclaimer, the term of this patent is extended or adjusted under 35 U.S.C. 154(b) by 0 days.

(21) Appl. No.: 18/932,405

(22) Filed: Oct. 30, 2024

(65) Prior Publication Data

US 2026/0120150 A1 Apr. 30, 2026

(51) Int. Cl.

| | |
|---|---|
| ***G06Q 30/00*** | (2023.01) |
| ***G06F 40/186*** | (2020.01) |
| ***G06Q 30/0241*** | (2023.01) |
| ***G06Q 30/0251*** | (2023.01) |
| ***G06T 11/60*** | (2006.01) |

(52) U.S. Cl.

CPC ....... *G06Q 30/0276* (2013.01); *G06F 40/186* (2020.01); *G06Q 30/0259* (2013.01); *G06Q 30/0277* (2013.01); *G06T 11/60* (2013.01)

(58) Field of Classification Search

CPC ........... G06Q 30/0276; G06Q 30/0259; G06Q 30/0277; G06F 40/186; G06T 11/60

See application file for complete search history.

(56) References Cited

U.S. PATENT DOCUMENTS

| | | | |
|---|---|---|---|
| 7,383,320 B1 | 6/2008 | Silberstein et al. | |
| 7,788,132 B2 | 8/2010 | Desikan et al. | |
| 7,958,007 B2 | 6/2011 | Urbanski et al. | |
| 8,781,895 B2 | 7/2014 | Macartney-Filgate et al. | |
| 9,954,794 B2 | 4/2018 | Cheng et al. | |
| 10,514,896 B2 | 12/2019 | Varadarajan et al. | |
| 11,151,606 B2 | 10/2021 | Garcia | |
| 11,409,948 B2 | 8/2022 | Al-Sallami et al. | |
| 11,509,714 B2 | 11/2022 | Demsey | |
| 11,669,578 B2 | 6/2023 | Thangeswaran et al. | |
| 2008/0195477 A1* | 8/2008 | Kennedy | G06Q 30/0256 705/14.27 |
| 2010/0082808 A1 | 4/2010 | Vaynblat et al. | |
| 2011/0138011 A1* | 6/2011 | Finlaw | G06Q 30/0625 709/217 |
| 2015/0019948 A1* | 1/2015 | Roth | G06F 16/958 715/226 |
| 2017/0228815 A1* | 8/2017 | Plaehn | G06Q 30/0639 |

(Continued)

*Primary Examiner* — Meredith A Long
(74) *Attorney, Agent, or Firm* — McCoy Russell LLP

(57) ABSTRACT

Methods and systems for webpage template management. The method includes, in one example, generating a webpage based on a template associated with a grouping of one or more locations, surfacing a set of eligible dynamic content onto the webpage based on a set of widgets that control display eligibility through multiple settings that are both included in the template, and distributing the webpage to a host device. In the system, the webpage corresponds to a physical location that is included in the grouping of the one or more locations and the set of eligible dynamic content includes one or more offerings that are available at the physical location.

20 Claims, 7 Drawing Sheets

(56) References Cited

U.S. PATENT DOCUMENTS

| | | | |
|---|---|---|---|
| 2020/0402010 | A1 | 12/2020 | Berry |
| 2022/0245155 | A1 | 8/2022 | Dixon et al. |
| 2022/0309121 | A1 | 9/2022 | Dickerson et al. |

* cited by examiner

LOCAL WEBPAGE TEMPLATE MANAGEMENT SYSTEM AND METHOD

FIELD

The present description relates generally to a platform for managing local webpage templates and surfacing dynamic content on webpages.

BACKGROUND/SUMMARY

Some large companies and organizations operate a large number of physical locations and/or operate in many different regional service areas. For instance, certain companies may oversee (in some capacity) hundreds or thousands of physical locations that may correspond to brick and mortar businesses, regional service areas, etc. While the physical locations may fall under one brand's umbrella, what each location offers can widely vary with regard to offerings such as services, products, promotions, pricing, job openings, etc. To elaborate, multi-location brands and organizations make available different offerings at different geographical levels (e.g., regional, national, location by location, and the like) and promote those offers across a wide array of platforms and webpages. The offerings and promotions change based on product availability, a brand's pricing scheme, etc. Effectively marketing a location digitally may require populating a location's specific offerings on a brand's website. However existing tools do not provide a viable means for efficiently managing or publishing the wide variety of different local offering information across multiple locations.

With regard to systems available to control both the presentation of offerings and content associated with a location, as well as the user experience for websites related to the brand's physical locations, multi-location brands have previously been stuck between two options. The first option being a one-size-fits-all approach that creates a generic set of offerings for all locations and their associated websites. The one-size-fits-all approach also lacks dynamic content support, such as live inventory support. To elaborate, offerings may exhibit frequency issues. For instance, offerings may change hourly as items are sold, preventing the offerings from being accurately maintained for each location using a static template that does not dynamically handle such updates. The one-size-fits-all approach does not vary the offerings displayed based on the actual availability of a given offering at a given location, leading to a poor customer experience. The second option involves the use of customized website templates with static offering content associated with the template, for each permutation of offerings available at the brand's locations. This option provides a way to show different offerings available on a brand's website, but has several shortcomings. First, it demands a comparatively high level of manual management due to the number of individual templates that must be maintained to reflect the high number of possible offering permutations. Second, it does not automatically accommodate the often frequent changes to the offerings available at a given location and instead forces manual intervention to associate a location with a new template as the location's offerings change. Accordingly, maintaining accurate offering information across a large number of templates is often unfeasible from a cost and time perspective for many organizations.

To overcome at least a portion of the aforementioned challenges, a method for webpage template management is provided. The method includes, in one example, generating a webpage based on a template associated with one or more locations of a common type or another suitable location grouping technique. The location type functions as a mechanism for grouping one or more locations to create presentation consistency across the one or more locations that have common offering types and/or other features. The method further includes surfacing a set of eligible dynamic content onto the webpage based on a set of widgets that control display eligibility through multiple settings. The set of widgets and the corresponding settings are both included in the template. The method even further includes distributing the webpage to a host device. In such an example, the webpage corresponds to a physical location (e.g., a geographical location of a brick and mortar business or organization, a geographical location or region corresponding to a mobile service, and the like) and the set of eligible dynamic content includes one or more offerings (e.g., product offerings, service offerings, event offerings, and the like). In this way, the webpage is surfaced with specific offerings that are available at a specific location and the webpages are grouped using the location type or other suitable technique to maintain an overlapping look and feel across multiple webpages due to the use of a common template for the generation of the webpages. Consequently, the offering frequency issues discussed above is addressed using a system that allows a client to effectively manage a large number (e.g., thousands or tens of thousands) of webpages and scale the webpage management to accommodate accurate marketing of the brand's local offerings.

In one example, generating the webpage includes populating the webpage with a set of static content that is included in or otherwise associated with the template. In this way, static content is effectively populated on the webpage in tandem with the step of surfacing the dynamic content on the webpage. The static content persists across multiple locations that use the template and is not assigned to specific locations. For example, static content may include the inclusion of a retailer's return policy that is common across all of their stores. The static content may be managed at the template level using a page builder. Therefore, the static content does not change based on offerings at the given location and is managed at a template level whereas the display of the dynamic content changes based on the reality of what is offered at a given location and is managed at a broader level in the template management system. In this way, the client is able to more efficiently manage the dynamic content at scale.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for efficiently managing webpage templates for companies, organizations, etc. at scale while providing location specific dynamic content to the webpages. Specifically, the template management system allows dynamic content that corresponds to offerings (e.g., product offerings, service offerings, event offerings, and the like) to be efficiently surfaced on webpages in a location specific manner. Offerings may include anything presently available at a location such as deals/promotions, a staff member/person, a job opening, etc. The system allows companies, organizations, etc. to create unique webpage designs, experiences, layouts, and the like at scale for different types of locations from a single system, if desired. One or more physical locations are associated with each location type. A location type is determined manually or programmatically as part of an integration with a client's source data system. Further, a physical location, as discussed herein, is a brick and mortar location and/or a service area business (with an associated location or region) that offers products, events, services, combinations thereof, and the like. Examples of physical locations specifically include, but are not limited to, brick and mortar stores (e.g., retail stores), lodgings (e.g., hotels, motels, etc.), event spaces, offering locations/regions for organizations (e.g., political organizations, non-profit organizations, and the like), etc. Examples of service area businesses such as plumbers or electricians that provide services to homes, jobsites, and the like but do not maintain a brick and mortar location that customers are able to visit, for instance. Additional examples of physical locations include hybrid locations that offer both service area support as well as brick and mortar access. The system is additionally designed to populate websites with static content that does not vary by location, such as a brand's return policy or email sign-up form. This static content may persist across webpages that are associated with different physical locations that use a common template. To elaborate, the static content is not assigned per physical location. The static content may be managed at the template level using a page builder. Conversely, dynamic content uses either information provided programmatically via an integration with a brand's secondary data source related to their offerings (e.g., an inventory management system), manual input, and/or in another suitable programmatic manner. Therefore, the number and content of offerings may vary from location to location. Put another way, the dynamic content changes based on the reality of what is offered at a given location whereas static content does not. For instance, in one use-case example, two stores may offer the same product but pricing or promotions for that item differ based on location.

Figure 1:
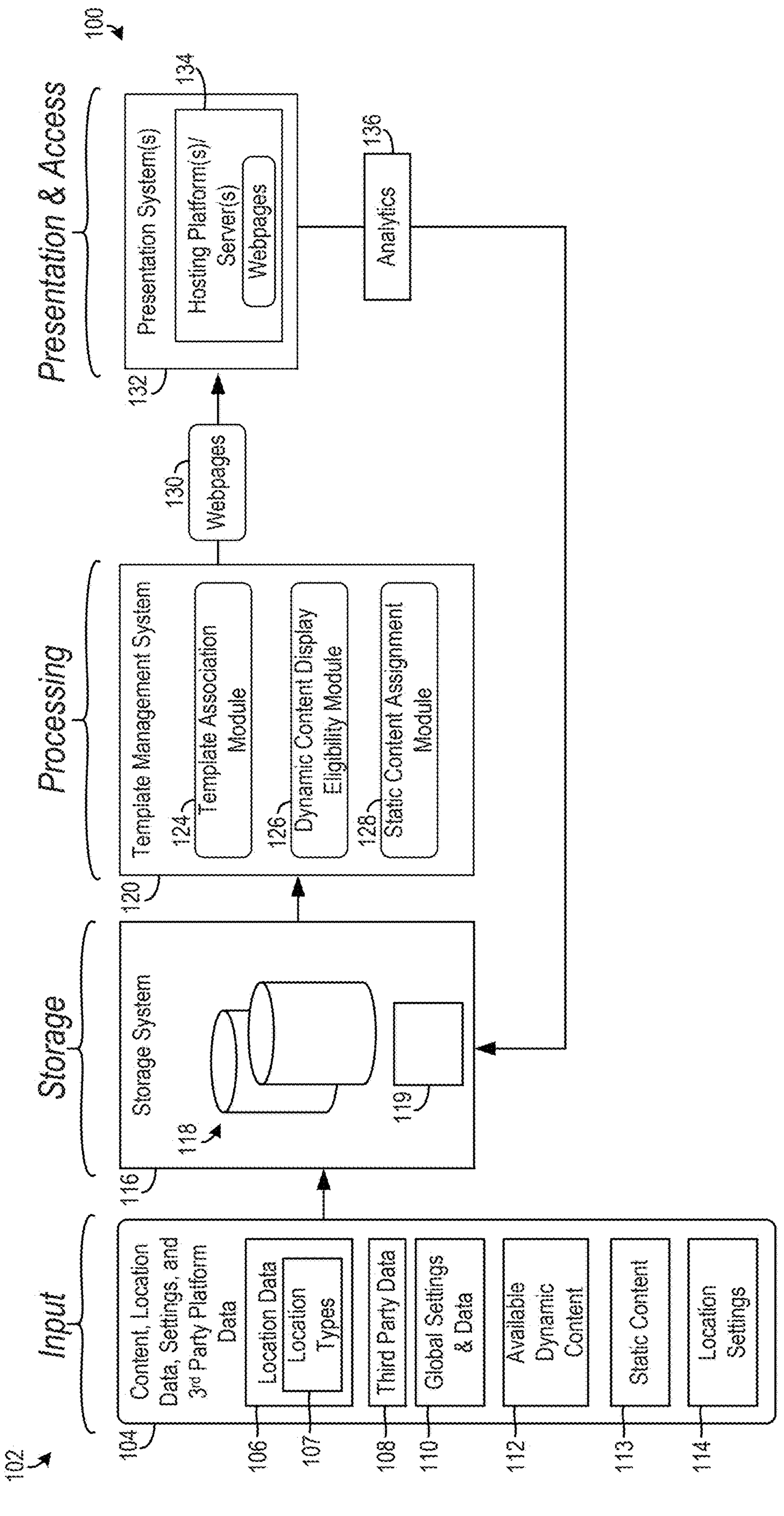
FIG. 1 shows a process flow diagram for a template management system.

FIG. 1 shows an example of a template platform 100 and a process flow 102 demarcated via inputs, storage, processing, as well as presentation and access segments. Clients, administrators, and end-users are able to interact with the template platform at different locations.

The inputs may specifically include content, location data, settings inputs, and third party platform data 104. To elaborate, location data 106 may be provided by the client via an application program interface (API), file intake, and/or manual entry. The location data 106 may include hours of operation for a webpage that corresponds to a physical location, a phone number for the physical location, an address of the physical location, and the like. As previously indicated, examples of offering locations specifically include, but are not limited to, brick and mortar businesses (e.g., retail stores, service storefronts, and the like), lodgings (e.g., hotels, motels, etc.), event spaces, offering locations/regions for organizations (e.g., political organizations, non-profit organizations, etc.), business service areas, and the like.

The location data 106 may include location types 107. The location types may be used to associate one or more locations with a set of templates using one or more location types or other suitable technique for grouping locations. The location type is therefore an attribute of a location. Therefore, each location type is associated with one or more physical locations. For instance, physical locations within a geographical region may all be grouped within one location type associated therewith. More generally, the physical locations may be grouped in based on user predilection. The templates described herein are page-type specific collection of settings and display configurations that are used to create a webpage and represent a group of webpages in the abstract. As discussed in greater detail herein the templates may be managed through a drag and drop interface and the templates include both dynamic and static content.

The inputs may further include location-specific third party data 108 that may include information specifically related to a location or set of locations that is separate from the location's offerings, such as customer reviews of the location, nearby points of interest, local statistical information such as demographics, etc. Such information is also considered dynamic because it varies by location and may change frequently. The inputs may further include global settings and data 110 which may be defined by the client and may be applied to all of the websites that the client manages. The global settings and data 110 may include brand colors, brand fonts as well as styling, and brand-specific navigation bars. In one example, the navigation bar may be optionally overridden at the template-level.

The inputs may further include available dynamic content 112 that may be created manually, via an integration, and/or in another suitable manner. Once created, the dynamic content is eligible for assignment. Dynamic content assignment is expanded upon herein with regard to the functionality of a template management system 120.

The available dynamic content 112 takes the form of offering data such as data associated with product offerings, service offerings, and/or event offerings. The available dynamic content may also take the form of product data, career data, data corresponding to people, promotion/offer data, event data, textbook data, location specific image data, frequently asked question data, local statistics data, map data, review data, service data, business information data, (e.g., phone number data, address data, direction data, appointment booking data, purchase online data, purchase in-store data, and the like), policy data, custom code blocks, combinations thereof, and the like. Dynamic content is updatable (e.g., manually and/or programmatically updatable) by the client at their discretion at the location level to reflect the currently available offerings at the location whereas static content is content that persists across multiple locations using a template and is managed at the template level using a page builder.

The inputs may further include static content 113. The static content 113 is content that is either configured with a specific widget, or attributes of a location itself. The static content 113 may specifically include image data, call to action (CTA) data (buttons, links, combinations thereof, and the like), blocks of text, location name data, location phone number, location operating hours data, and the like. As discussed in greater detail herein, static content may be defined at a template level such that it is shared and consistent across all locations which use the template. Static content management in the system is described in greater detail herein. Static content widgets may include text elements that vary based on location attributes (e.g., location name, phone number, hours, and the like). Such content widgets are considered static because their presence is dependent on the page's instantiation, not the variability of offerings at the location. In other words, the system may use location attributes as variables in rendered page content. However, it should be understood that this page content that is rendered based on such location attributes is not considered dynamic content.

The content, location data, settings inputs, and third party platform data 104 may be transferred from the client devices and/or other suitable devices to a storage system 116 that may be in the form of template management platform databases 118, third party storage/management services 119, and the like. The databases, third party storage/management services and the like discussed herein, may be electronically connected and configured to perform data management functions such as automatic updates, data retrieval, data indexing, and the like.

From the storage system 116, the inputs may be transferred to a template management system 120. The template management system 120 includes modules for implementing different functions of the system. A module as described herein includes instructions that are stored in memory and executable by a processor to implement the functions of the module. The modules in the template management system may be stored on one or more template system servers. The template management system 120 is generally configured to establish associations between content and physical locations and evaluate touchpoint eligibility.

The template management system 120 further includes a template association module 124 that is configured to determine the association between templates and location types. To elaborate, the template association module 124 is configured to determine the correspondence between a template and location type. To elaborate, each location type may be assigned to a template per page type. Further, the locations are assigned to a location type. For instance, template A may be assigned to a location type A. In such an example, locations A, B, and C are grouped via location type A. Therefore, locations A, B, and C will use template A.

The templates may be grouped using assignment sets. Specifically, the template management system 120 may be configured to organize multiple templates into assignment sets of page-type specific templates. In such an example, the assignment set may be associated with a location type. Accordingly, the template management system 120 may be configured to populate a microsite experience. For instance, an assignment set may include page types designed to present specific types of local content such as local product lists and local product detail webpages. If enabled, and at least one offering related to a page type is available at a location, the template management system may create webpages that list products (e.g., by category) at a location and may also publish specific webpages that are related to a product at a specific location. Conversely, in this example, if the webpage type is disabled at the system level, or does not have a template of the appropriate type included in the assignment set, then that webpage will not be instantiated even if there is content associated with a location that would support webpage creation. In this way, the template management system is more robust than traditional website template systems because the template management system allows for the dynamic creation of a complete microsite, not just dynamically surfacing content on a single page, if desired. Further, the instantiation of each page type and individual page instance may be dependent on the availability of offerings at each location. For example, some locations with products will have product list pages if they carry Brand A, whereas other locations may only have product list pages for Brand B if they don't carry brand A. Assignment sets are discussed in greater detail herein with regard to FIG. 2. Additionally, the template management system 120 enables webpage configuration across all local page types. To elaborate, each individual template may be page-type specific. Each of the exemplary page types provided below would be a discrete template. Additionally, each page-type may have specific schema that allows it be found on search engines. Examples of page types include but are not limited to a location homepage page type (e.g., a webpage that presents an overview of a location/stores offerings), a product list page type (e.g., a webpage that presents an overview of product available in a store), a product detail page type (e.g., a webpage presenting an overview and purchase options for a specific product), a service list page type, a service detail page type, a person list page type, a person detail page type, an event list page type, an event detail page type, etc. Thus each webpage may be dedicated to a specific type of content or function. The page types may further include local offering detail pages (e.g., a page type with specific offering (e.g. product, service, person, event) at a specific location), local offering list pages (e.g., within each type of offering a list of specific offerings of that type, may be filtered down to a specific subset (e.g., Barbers at our Brooklyn location or ABC Cellular Smartphones at 123 main street, in one use-case example)), and local home pages (e.g., primary webpages that represent a location, showcases different offerings and info related to the location and provides link to subpages).

In one example, the template management system 120 may optionally include two additional layers for template display within a location type. For instance, templates may be assigned to locations within a location type via either traffic percentage or other arbitrary criteria related to the set of locations.

In the location type example, a telecommunication company may tailor the look and feel of their webpages based on the characteristics of their stores. First the telecommunications company may create two location types: "Experience Stores" and "Corporate Stores." Next the telecommunications company creates two templates: "Template A" and "Template B." The company may then assign template A to the "Experience Store" location type and assign template B to the "Corporate Store" location type. The template management system may then check which location type any individual store/location is in and use that information to determine whether the webpage should use Template A or Template B. As a result, all webpages for locations in the "Experience Store" location type will use Template A while all webpages for locations in the "Corporate Store" location type will use Template B.

In the traffic percentage and location type example, a company may want to see if changing the order of content on their webpage will impact customer engagement with the website (e.g. conversion rates). To do this, the company may run an A/B test of two templates for their Location Detail webpages (e.g., a homepage for a specific store). To set up the A/B test, the company may create a primary template that is assigned to the "Authorized Retailer" Location Type. Additionally in one use-case example, the company may create a secondary template that is also assigned to the "Authorized Retailer" location type but they set it to only appear for 40% of the webpage's traffic. As a result, 60% of users who access a webpage for any "Authorized Retailer" location will see the primary template and 40% of the users will see the secondary template. In this way, advertising tests may be more effectively carried out by the clients and ultimately allows higher traffic to be directed to the webpages to increase the client's revenue.

The template management system 120 further includes, in the illustrated example, a dynamic content display eligibility module 126 that is configured to determine dynamic content that is eligible for surfacing on a webpage for display. In one use-case example, a telecommunications company may want to showcase a first brand's mobile device products in stores located in higher income areas and a second brand's mobile device products in stores located in lower income areas. To do this, the telecommunications company creates two distinct webpage templates. Both of the webpage templates feature a "Product Showcase Widget" at the top of the page. However, one "Product Showcase Widget" is filtered to show products associated with the first brand and the other "Product Showcase Widget" is filtered to show products associated with the second brand.

The template management system 120 further includes, in the illustrated example, a static content assignment module 128 that is configured to determine and retrieve a set of static content included in each template that is populated onto the webpage. As such, the set of static content is associated with a template rather than a location. Thus, a specified set of static content may be used for all locations that correspond to one type of template. Once surfaced with the appropriate dynamic and static content, the webpages 130 are sent to a presentation system 132 that includes hosting platform(s)/server(s) 134 where the webpages are stored. Subsequently, end-users are able to access the webpages for display on their computing devices. Additionally, devices, platforms, etc. in the presentation system 132 may be configured to send analytics 136 back to the storage system 116 as discussed in greater detail herein.

In one example, the template management system 120 is configured to instantiate structured data related to offering schema and analytics data in parallel or responsive to surfacing of the eligible content on the webpage, as discussed in greater detail herein.

The analytic data functions as a robust data layer designed to capture what template, widgets, settings, and content were in use on a webpage during a customer visit/interaction. This enables clients to test many variations of layout, display settings, and content while getting detailed information on what leads to engagement and disengagement. Examples of the analytics include page type (e.g., "Business Detail", "Product List", "Product Detail", etc.), location identifier (e.g., an internal identifier), template title, content type (e.g., "Business", "Service", etc.), widget types (e.g., the specific widgets that were on the webpage when visited), content identifiers (e.g., identifiers for specific content that was displayed on the webpage), and the like.

Figure 2:
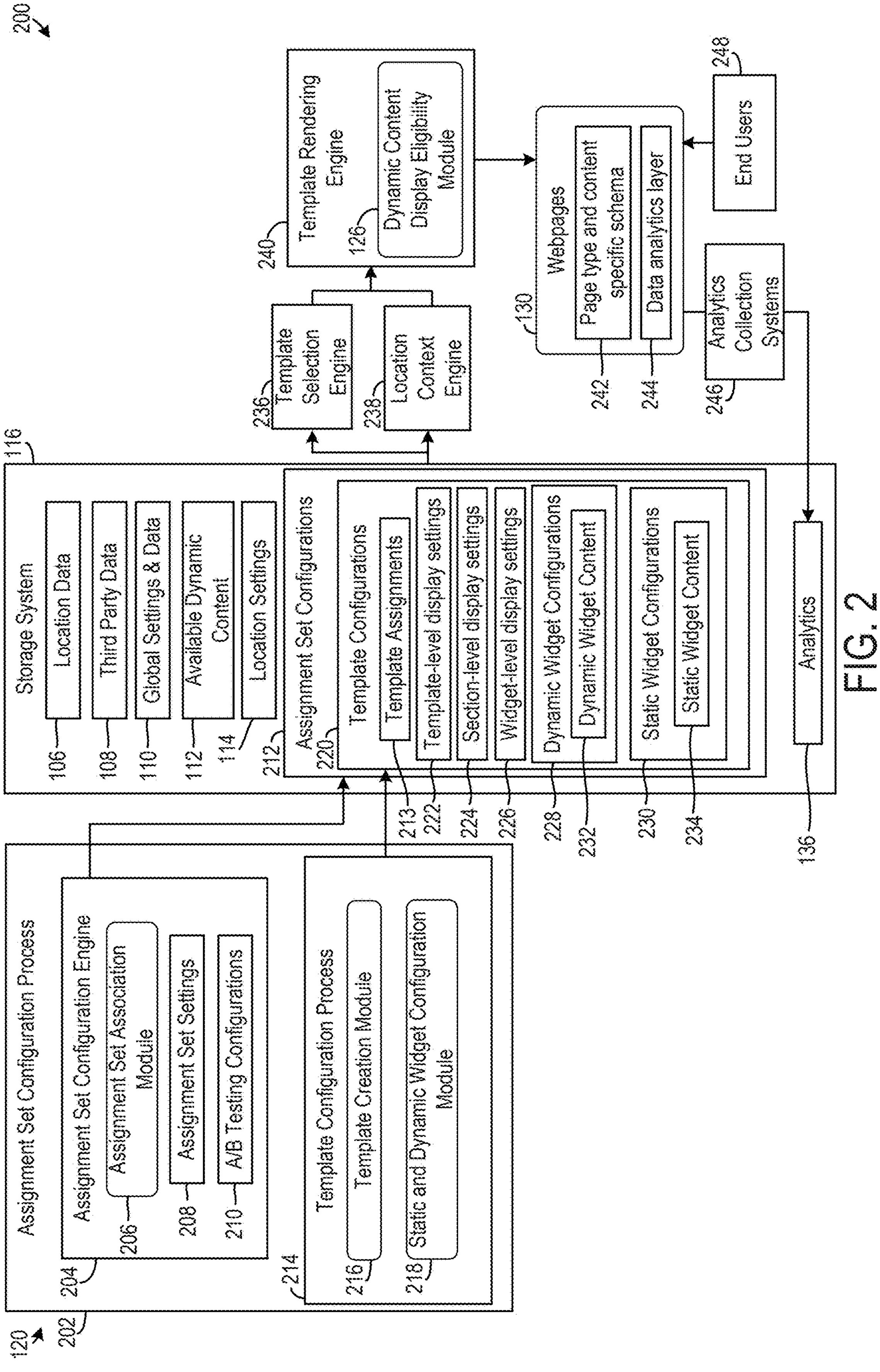
FIG. 2 shows a more detailed process flow diagram for template creation in the template management system, depicted in FIG. 1.

FIG. 2 show a process flow 200 for the template management system 120 that allows the client to create and alter assignment sets that allow the client to group multiple templates together using an assignment set configuration process 202 that includes an assignment set configuration engine 204, in the illustrated example. However, the template grouping functionality may be omitted from the system in alternative embodiments.

The assignment set configuration engine 204 is generally configured to create, alter, and otherwise manage assignment sets. An assignment set is an intermediary construct that associates locations with templates. Assignment sets contain settings (e.g., name and description), template assignments by page type including A/B testing configurations and location type assignments as expanded upon below.

The assignment set configuration engine 204 includes an assignment set association module 206, assignment set settings 208, and A/B testing configurations 210, in the illustrated example.

The assignment set association module 206 is configured to assign one or more location types to each of the templates that is included in the assignment set. In this way, the assignment set association module 206 controls page eligibility where selected page types are grouped within an assignment set. Further, each eligible page type with an assignment set may have a template assigned thereto. The assignment set configuration engine 204 also may be configured with location grouping functionality. For example, all locations in a group of locations that are assigned to an assignment set use the templates in that assignment set for each page type.

Within the assignment set configuration process, the client may additionally create and/or alter assignment set settings 208. The assignment set settings 208 allows for setting configurations that are shared across templates in an assignment set. For example, the assignment set settings may include common styling for widgets such as buttons.

Additionally, the client may create and/or alter A/B testing configurations 210 with the assignment set configuration process. Therefore, the template management system 120 is configured for A/B testing and/or conditional variation. To expound, the template management system 120 may support varying templates within a set according to either a simple parameter or an arbitrary condition. The simple parameter may, in one use-case example, specify that "Template A" is shown X % of the time and Template B" is shown Y % of the time. The arbitrary condition may, in one use-case example, specify that "Template A" is shown by default but if a location within the location type grouping has the label "Spanish speaking" "Template B" is shown. However, other suitable arbitrary conditions are possible.

As shown in FIG. 2, the assignment set configurations 212 output from the assignment set configuration process 202 are stored in the storage system 116, in the illustrated example. Template assignments 213 are included in the assignment set configurations 212. Similarly, the outputs of a template configuration process 214 (that is expanded upon below) may additionally be stored in the storage system 116.

Similar to FIG. 1, the storage system 116 depicted in FIG. 2 again includes the location data 106, the third party data 108, the global settings and data 110, the available dynamic content 112, and location settings 114.

The template management system 120 is further configured to implement the template configuration process 214 (e.g., within the assignment set configuration process 202, in the illustrated example). The template configuration process 214 may involve a template creation module 216 and a static and dynamic widget configuration module 218.

The template creation module 216 is designed to generate template configurations 220 that are stored in the storage system 116. To expound, the template creation module 216 allows a client to create, alter, and send the template configurations 220 to the storage system 116. The template configurations 220 include the template assignments 213, in the illustrated example. The template configurations 220 may further include template-level display settings 222, section-level display settings 224, and widget-level display settings 226.

The display settings described herein may explicitly control what type of dynamic content is eligible to appear on an associated webpage. For instance, the display settings may allow products to be shown on a webpage but not show services or only allow products of specific brands to be shown on the webpage, in different use-case examples. The display settings may also control how different types of content are displayed on a webpage. For instance, the display settings may specify that one type of offering (e.g., products) is shown in a carousel and another type of offering (e.g., services) is displayed as a series of tiles, in one use-case example. Furthermore, the display settings may not control the eligibility of a given type or piece of content to be distributed to downstream digital mediums beyond the associated webpage which the template controls. For instance, the display settings may not control how a piece of content is distributed from the webpage to a mapping platform.

The template-level display settings 222 may include display settings such as vertical padding between sections, horizontal margins around sections, title, and/or layout alignment. The section-level display settings 224 may include vertical positions of the sections (relative to other sections), background color of the sections, and full width of the sections.

The section-level display settings 224 may specify vertical and horizontal padding of the sections (relative to other sections), space between the widgets within the section, background color of the sections, and full width of the sections. The widget-level display settings 226 may include content type (e.g., static and dynamic), widget title, widget sub-title, title alignment, horizontal position (e.g., relative to other widgets in the same section), display mode, content filters (e.g., a filter which solely shows a product (e.g., a smartphone, a tablet, a laptop, a desktop, and the like) in a device showcase), showcase type (e.g., general or group), and maximum content count.

The widget-level display settings 226 may include content type (e.g., static and dynamic), widget title, widget sub-title, title alignment, horizontal position (e.g., relative to other widgets in the same section), display mode, content filters (e.g., a filter which solely shows a product (e.g., a smartphone, a tablet, a laptop, a desktop, and the like) in a device showcase), showcase type (e.g., general or group), and maximum content count.

The template creation module 216 may be configured to handle "common" elements and settings across all the templates such as the header and footer, color scheme overrides, etc.

The static and dynamic widget configuration module 218 may further be included in the template configuration process 214. The static and dynamic widget configuration module 218 may be configured to generate, alter, and send dynamic widgets 228 and static widgets 230 to the storage system 116. Dynamic widget content 232 is embedded in the dynamic widgets 228 and static content 234 is embedded in the static widgets 230.

A widget as described herein is a component that can be arranged on a template. Widgets may have a combination of "static" and "dynamic" configurations. The static widget configurations 230 are stored within the template configurations 220. An example of a static widget is a title and a reference to location data.

The dynamic widget configurations 228 involve dynamic content such as offerings. A dynamic widget is a widget that is dependent on a type of dynamic content (e.g., a list of products and the like) that may or may not be associated with a location. The dynamic widget may contain content filters (e.g., solely display products of a specific brand), settings (e.g., a feature that allows or prevents the display of pricing), and display modes (e.g., tile, carousel, style A, style B, and the like) that show pricing. When rendered to a webpage (as expanded upon herein), the dynamic widget shows the dynamic content if the content is included in the context that is being rendered.

A static widget is a widget that does not contain configuration of dynamic content. Settings and display modes may be present within the static widget. An example of a static widget may be a block of text describing a brand and displaying a generic logo, or displaying a location's phone number and address. Another static widget example includes terms and conditions that are the same across all contexts.

The dynamic widget content 232 may be an offering of a location. An offering is a product, promotion, person, service, and the like that are available in a physical location. Attributes about the physical location such as a location's phone number, hours of operation, etc. are not dynamic content.

Further in the illustrated example, a template selection engine 236 and a location context engine 238 are provided in the template management system 120. The template selection engine 236 is configured to select templates that are transferred from the storage system 116 to the template rendering engine 240. The template (of a requested page type) is selected by the engine if it is paired to a location. The location context engine 238 is configured to determine location context for the selected template and transfer the location context to the template rendering engine 240. Location context is data demanded to render a webpage. When a webpage is rendered, the template is selected by the combination of location type, page type, and A/B testing configuration, in the illustrated example.

The template rendering engine 240 is configured to render the selected template using the "context" which includes location information and dynamic content. For example, context might include a location's name, address, phone number, and dynamic content such as specific products that are carried by that location, events that the location is holding, etc. Context may generally represent what is offered at a location with regard to products, services, etc.

The template rendering engine 240 is configured to determine content for display on the selected template. Dynamic content will be rendered on a webpage if it is assigned to a location, a corresponding widget has been added to the template for that location, and the dynamic content meets display eligibility of the widget (e.g., only show offering of a selected brand specific type).

This determination may specifically be carried out via the dynamic content display eligibility module 126 that is included in the template rendering engine 240, in the illustrated example. The dynamic content display eligibility module 126 surfaces eligible dynamic content (that is associated with offerings) onto the appropriate webpage. To expound, content will be displayed if it is both assigned to a location and that location uses a template with a widget for that type of content. The widget may also impose filter conditions. For example, a product widget may have a filter that specifies that solely products of one brand will be displayed. It will be understood that the eligible dynamic content may reflect the reality of what offerings are available at a given physical location and may not simply specify offerings the client chooses to display. Static content for the webpage may be populated in tandem with the surfacing of the dynamic content. The instantiation of each page type and individual instance is dependent on the availability of offerings at each location. For instance, some locations with products will have product list pages if they carry Brand A, whereas other locations may only have product list pages for Brand B if they don't carry brand A.

In one example, the template management system 120 manages the dynamic content in multiple layers, the first layer being an assignment layer which determines the type of content that is distributed to specific locations (e.g., an API may be used to send offering availability data on a location-by-location basis). In such an example, the second layer is an eligible display widget layer where after content is assigned to a location, there is a corresponding widget present on the template that the location is using for its webpage. Content may be displayed when content is both assigned and the template has a widget for that content type (e.g., a service showcase, a product showcase, etc.). Using the API to distribute the offering availability to a multitude of webpages, allows availability data (which may be in a variety of different formats, prior to processing by the API) to be efficiently gathered and distributed to the webpages with regard to processing resources.

As previously mentioned, the template management system 120 is configured to instantiate structured data related to offering schema and analytics data in parallel or responsive to surfacing of the eligible content on the webpage. The structured data related to the offering schema is data designed to be read by website crawlers that assist systems, such as search engines, in understanding the webpage and rank it in a search, for instance. As such, the offering schema is used to inform search engines of the content of a page in a structured, machine-readable format. All of the webpages that are surfaced with dynamic or static content may use schema that contains specific details about the offering or topic that the webpage is related to as well as location information.

The webpages 130 that are rendered include page type and content specific schema 242 as well as a data analytics layer 244. An analytics collection system 246 may gather the data analytics from the webpages 130 and transfer the analytics 136 back to the storage system 116. Further, as previously mentioned end users 248 are able to access the webpages 130 once they are rendered.

Additionally, the templates in the template management system may use a responsive design such that they collapse from desktop device to mobile device views seamlessly, in one template.

Figure 3:
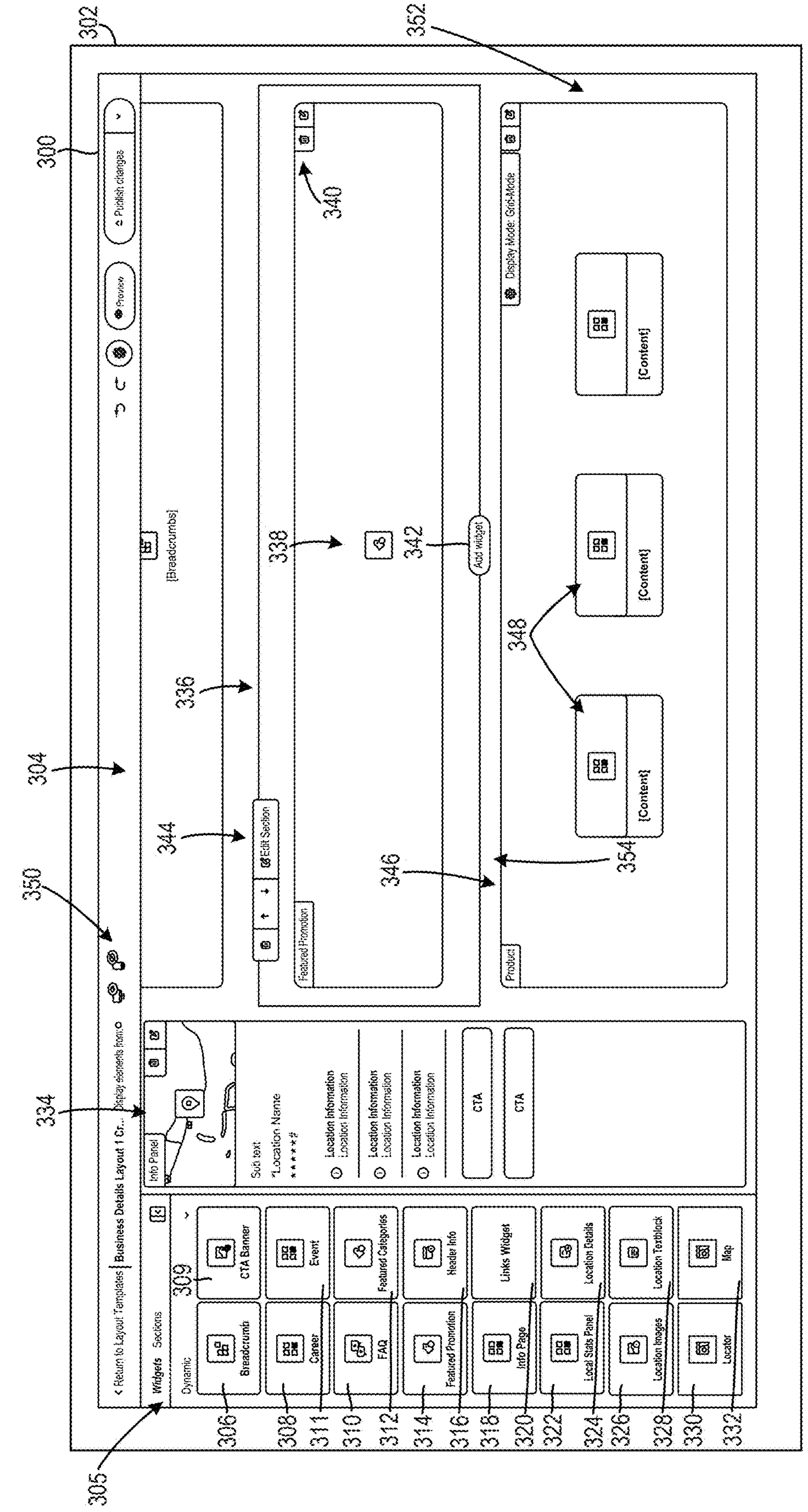
FIG. 3 shows a template creation graphical user interface (GUI) for a client.

FIG. 3 shows a graphical user interface (GUI) 300 presented on a display 302. It will be understood that the display 302 may be included in a client computing device, such as the client computing device 704 (shown in FIG. 7 and discussed in greater detail herein) or another suitable computing device.

The GUI 300 has a template 304 for a webpage displayed thereon that is editable by the client. It will be understood that the template 304 has been previously assigned a location type which encompasses one or more locations that have associated webpages.

The template 304 includes content display eligibility widgets 305 that allow the client to create widgets that function as slots for different types of dynamic content or interactive capabilities such as getting directions, booking an appointment, or buying an item or service online or local pickup or use. Such interactive widgets may be dynamically configured to be specific to the presented location or static such as a link back to an ecommerce or brand website. To elaborate, the content display eligibility widgets 305 allow the client to create a set of widgets that are included in the template.

The content display eligibility widgets 305 may specifically include, as a non-limiting example, a breadcrumb widget 306, a career widget 308, a banner widget 309, an event widget 310, a frequently asked question (FAQ) widget 311, a featured categories widget 312, a featured promotion widget 314, a header information widget 316, an information page widget 318, a links widget 320, a local statistics panel widget 322, a location details widget 324, a location images widget 326, a location text-block widget 328, a location widget 330, and/or a map widget 332. The content display eligibility widgets 305 may further include engagement function widgets that are used to control how customers are able to interact with brands on the local webpages. For example, the system may include "button" widgets that dynamically update with data (e.g., phone number, directions link, social media page link(s), etc. Additionally, the system may embed functions such as appointment booking or add to cart features via widgets. These functions allow customers to interact with other systems such as online purchasing systems for in-store pickup directly from the local webpages. The engagement function widgets are dynamic in the sense that the specific links or workflow that is loaded are specific to each location, when available.

However, it will be understood that the content specific display settings may include additional or alternative content specific display settings that support dynamic widget creation. The abovementioned content display eligibility widgets 305 function as slots for the specified types of dynamic content within the template 304.

The GUI 300 may further include an information panel 334 which allows the client to add static data to the template that corresponds to a geographical location of the brick and mortar business or a business service area, for example. This data may include a location name, a location's point on a map, a location's address, and/or other suitable location data.

The GUI 300 may further include various sections in which multiple widgets may be located. The sections function as containers for one or more widgets and enable a user to configure widget placement and layout settings that include vertical and horizontal padding of the section, space between the widgets, and background color of the section. Widgets function as containers and collections of display settings for specific types of content. To elaborate, widgets may serve as slots for dynamic or static content. As such, the widgets for the dynamic content may be referred to as dynamic content display eligibility widgets.

Specifically, a section 336 is provided in the GUI 300 that includes a featured promotion widget 338. Buttons 340 allows the client to edit or remove the featured promotion widget 338. The featured promotion widget 338 functions as a slot for promotions (which may be in the form of an image, a banner, an HTML and CSS document, and the like). An add widget button 342 may be provided in the section 336 to allow the client to add additional widgets to the section 336. The section 336 may include buttons 344 that allow the section to be deleted, moved, or edited.

The GUI 300 may further include a section 346 which includes dynamic widgets 348 that are presented in a grid in the illustrated example. However, the dynamic widgets may be displayed in another suitable manner may be provided in a grid-mode layout where the widgets 348 for dynamic content in the form of product data is provided. The GUI 300 may even further include buttons 350 which allow the client to sections that render specifically on desktop or mobile devices.

As shown, a layout of the information panel 334, the section 336, the section 346, and other displayed sections is established. Vertical padding between the sections is indicated at 352 and horizontal margins around the sections are indicated at 354. The vertical padding, the horizontal margins, a title, and/or a layout alignment (left, right, and center layout) of each section may be maintained within the template while dynamic content that populates the specific widgets that are located in the sections may be changed to match the specific offerings available at a physical location that is associated with a webpage. For instance, as discussed in greater detail herein, different products and promotions may be provided for different webpages associated with different offering locations while maintaining a common layout of the products and promotions to facilitate the visibility and sale of the brand's local offerings. In this way, a set of shared layout settings may be applied to a group of webpages with corresponding offerings that are grouped under one location type, for efficient distribution of tailored content to webpages while maintaining an overlapping look and feel between the webpages.

Figure 4:
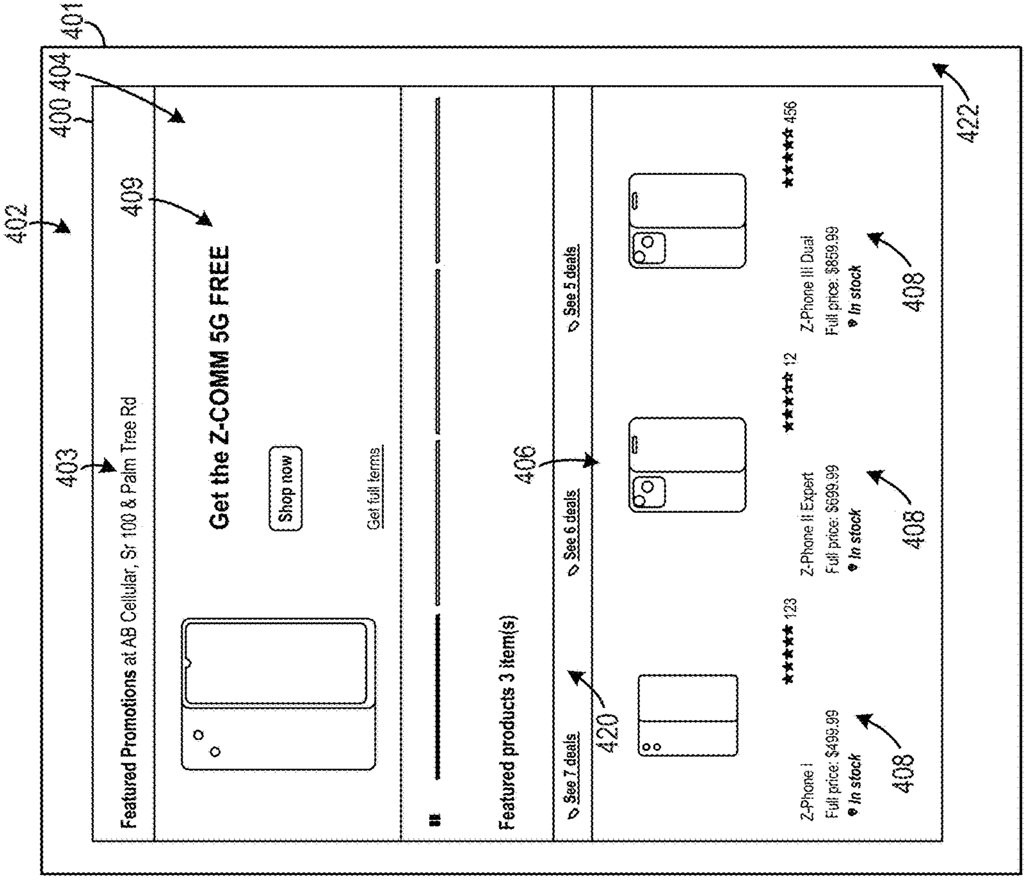
FIGS. 4 and 5 show two webpages that are generated via a common webpage template.
Figure 5:
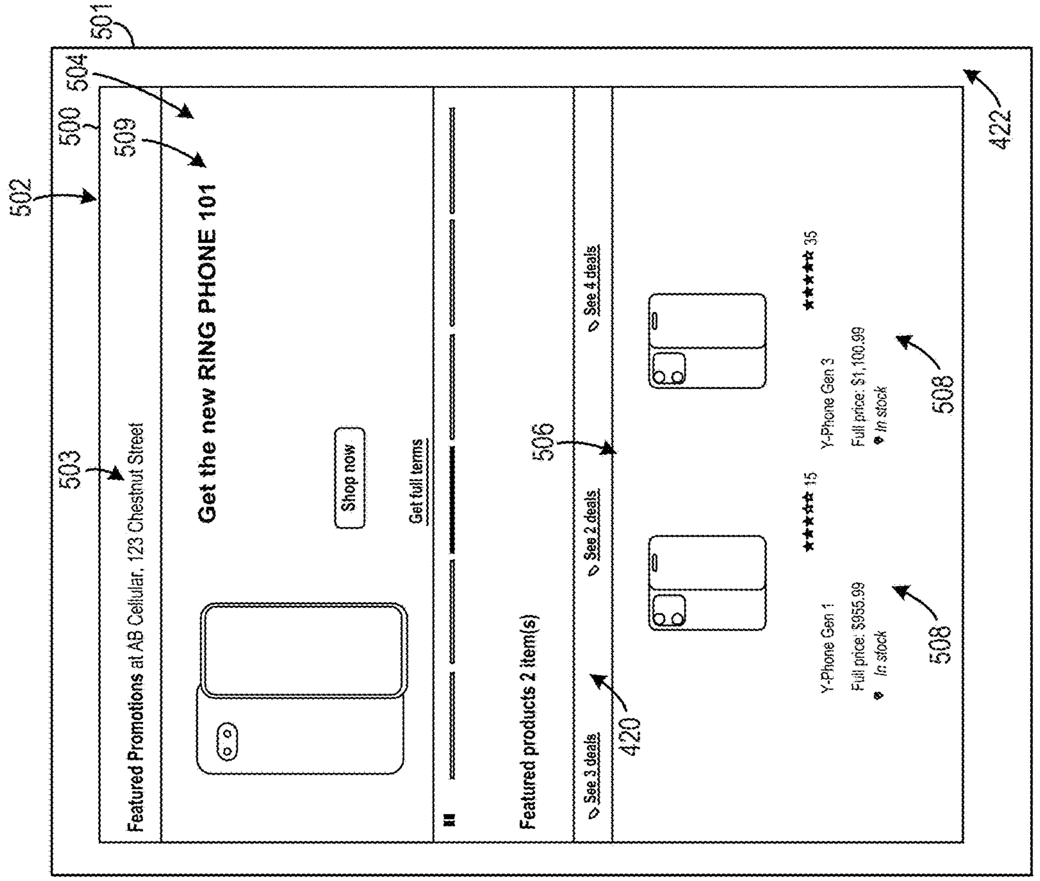

FIGS. 4-5 show different examples of GUIs 400 and 500 in webpages 402 and 502 that are presented on displays 401 and 501, respectively. The displays may be included in end user devices such as the end user device(s) 214 shown in FIG. 2, the end user device(s) 706 shown in FIG. 7 (discussed in greater detail herein) or other suitable computing devices. The webpage 402 has static content such as a corresponding address (and/or other representation of a geographical location) 403, which is presented thereon, and the webpage 502 likewise has a corresponding physical address (and/or other representation of a geographical location) 503, which is presented thereon.

The physical locations 403 and 503 are distinct but they are grouped under a common location type. Therefore, the webpages have a similar graphical layout (e.g., with regard to the size, spacing, and the like) of different sections, widgets, etc. However, the dynamic content presented on the webpages varies to reflect the different offerings which are currently available at each physical location, allowing end-users to be provided with up-to-date information for location specific offerings. This variance in the dynamic content is expanded upon below.

Due to both webpages being grouped under one location type, a common template is used for both webpages. As such, the same set of display settings for the static and dynamic content is used for both webpages 402 and 502. In the illustrated example, these display settings include vertical padding 420 between sections, horizontal margins 422 around sections, title, and/or layout alignment. The webpages 402 and 502 further includes a set of static content that is common to both webpages.

The webpage 402 includes a set of dynamic content 404. A portion of the dynamic content in the set of dynamic content 404 is surfaced in a section 406, in the illustrated example. To elaborate, the set of dynamic content 404 includes data (e.g., product images, product names, product review scores, product pricing, and/or product availability (e.g., in stock, out of stock, and the like)) corresponding to multiple product offerings 408. The set of dynamic content 404 further includes a promotional offering 409, in the illustrated example. The promotional offering 409 includes promotional data such as a description of the promotion, images, promotional terms, and the like.

Conversely, the webpage 502 includes another set of dynamic content 504. A portion of the dynamic content is surfaced in a section 506, in the illustrated example. The set of dynamic content 504 again includes data corresponding to multiple product offerings 508. The set of dynamic content 504 further includes a promotional offering 509, in the illustrated example. The promotional offering 509 includes promotional data such as a description of the promotion, images, promotional terms, and the like. It will be understood, that the dynamic content may additionally or alternatively include other types of dynamic content such as service offerings, career offerings, event offerings, frequently asked questions, and the like, as previously discussed.

As depicted, the products and promotions in the set of dynamic content 404 vary from the products and promotions in the set of dynamic content 504 due to the fact that the dynamic content reflects the products, or other offerings more generally, that are currently available at the physical location which corresponds to the specific webpage. In this way, the dynamic content may be tailored on a location specific level, enabling the end-user to receive current offering information for that particular physical location, thereby enhancing the user experience. Furthermore, the products available at specific physical locations may be presented on the webpage that corresponds to the physical location while the layout of the products and other dynamic content displayed within the webpage shares a common look and feel with other webpages which are geographically grouped with one another under a common location type.

Figure 6A:
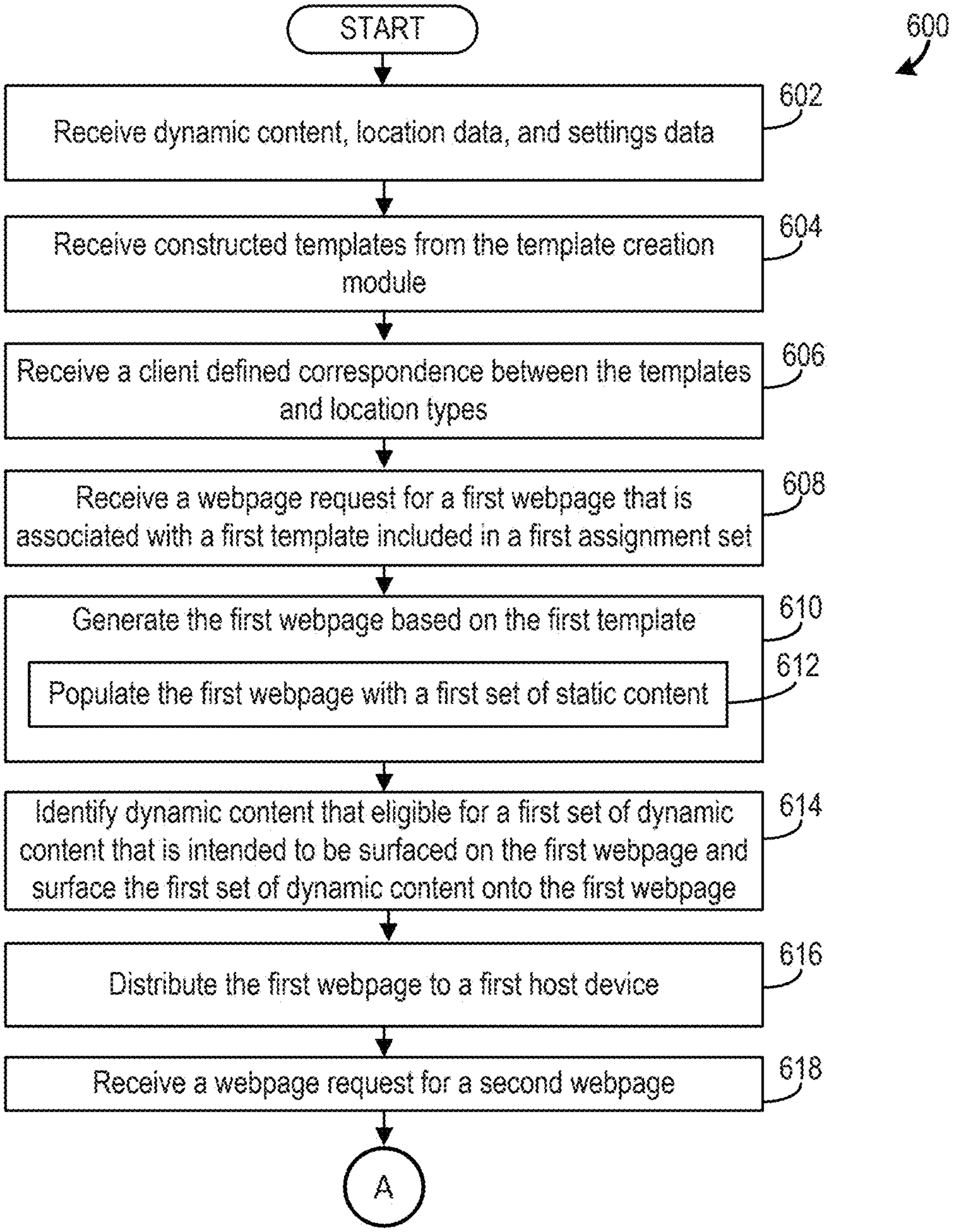
FIGS. 6A-6B show a method for webpage template management.
Figure 6B:
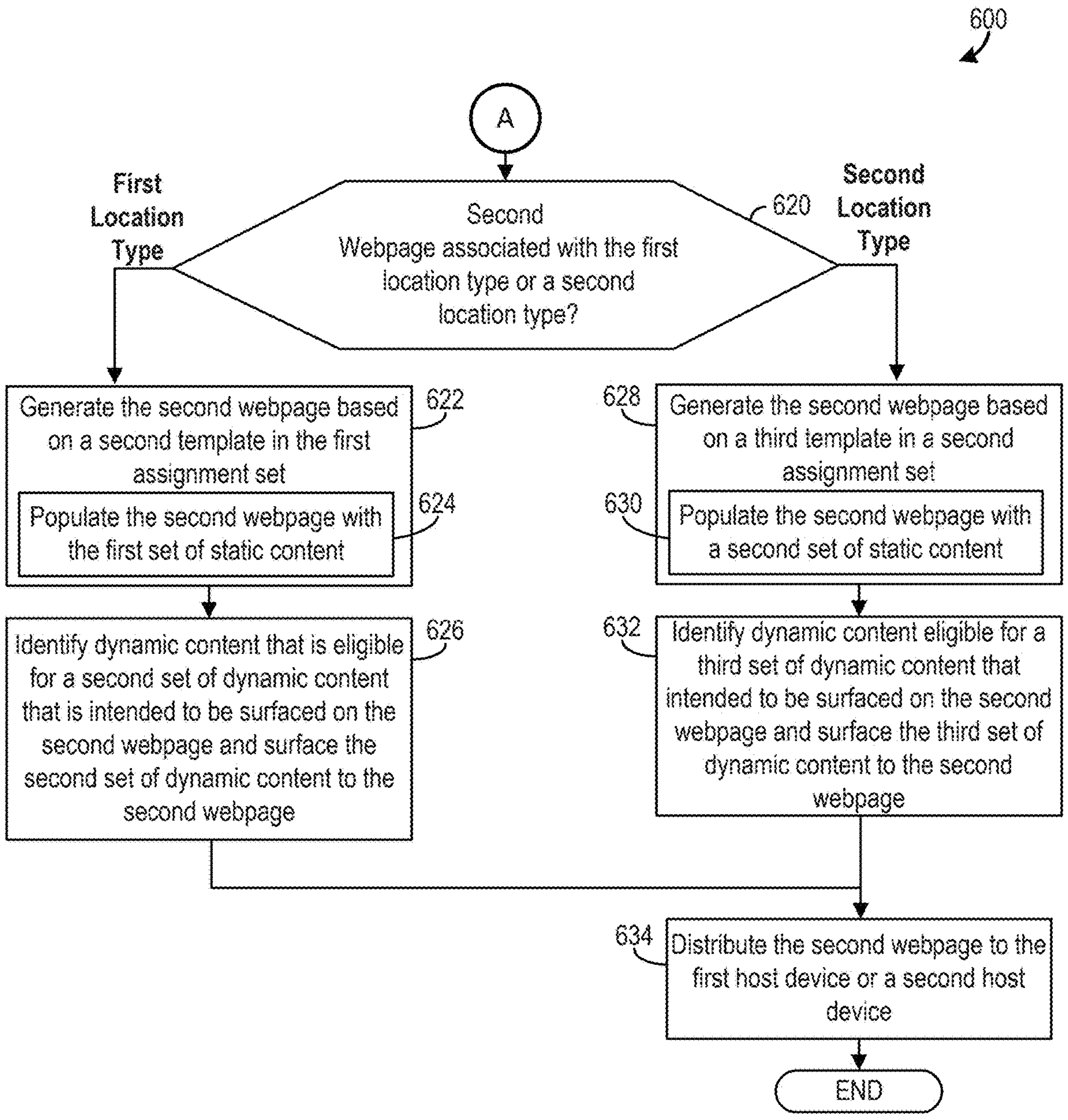

FIGS. 6A-6B show a method 600 for operation of a webpage template management system and other associated systems in the template management system's operating environment. The method 600 and the other methods described herein may be implemented by template management systems described herein, in one example, or combinations of the templates management systems, in other examples. In another example, the method 600 and/or the other methods described herein may be implemented by other suitable template management systems. Further, it will be understood that the method steps may be implemented as instructions stored in memory that are executable by a processor.

As shown in FIG. 6A, at 602, the method includes receiving dynamic content, location data, and settings data for webpages from a storage system that was previously generated and sent to the storage system via client computing devices. Examples of the dynamic content, location data, and settings is discussed above with regard to FIGS. 1 and 2.

Continuing with FIG. 6A, at 604, the method includes receiving constructed templates from the template creation module. The template inputs may include slots assigned to specific types of dynamic content and template-level settings such as vertical padding between sections, horizontal margins around sections, site title, and/or content alignment.

At 606, the method includes receiving a client defined correspondence between the templates and location types. For instance, the client may assign a first webpage template to a first location type, a second webpage template to a second location type, and so on. In this way, the webpage template may be used for all the physical locations that are grouped with the specific location type.

At 608, the method includes receiving a webpage request for a first webpage that is associated with a first template that is included in a first assignment set from a presentation system. For instance, an end-user may request access to the first webpage that is generated by the system using a first template that is associated with a first location type. As indicated above, assignment sets in the system group templates with a similar look and feel.

At 610, the method includes generating the first webpage based on the first template. Generating the first webpage includes at 612, populating the first webpage with a first set of static content. Generating the first webpage may further includes providing widgets for dynamic content within the first webpage based on display settings included in the first template.

At 614, the method includes identifying dynamic content that is eligible for a first set of dynamic content that is intended to be surface onto the first webpage and surfacing the first set of dynamic content onto the first webpage.

At 616, the method includes distributing the first webpage to a first host device (in the presentation system) where the client is able to access the first webpage. After the webpage is transferred to the host device, end-users are able to access and display the webpages on their computing devices. Next at 618, the method includes receiving a webpage request for a second webpage from the presentation system.

As shown in FIG. 6B, at 620, the method 600 includes determining if the second webpage is associated with the first assignment set or a second assignment set. If the second webpage is associated with the first template set, the method advances to 622 where the method includes generating the second webpage based on a second template in the first assignment set. Generating the second webpage includes at 624 populating the second webpage with the first set of static content. In this way, the same set of static content is populated on the first and second webpages.

Next at 626, the method includes identifying dynamic content eligible for a second set of dynamic content that is intended to be surfaced on the second webpage and surfacing the second set of dynamic content to the second webpage. It will be understood that the second set of dynamic content is different from the first set of dynamic content due to the fact that the sets of dynamic content correspond to offerings at different physical locations. However, the sets of dynamic content may be surfaced using a similar content layout with regard to margins, sizing, etc. due to the fact that they are included in the same assignment set as previously discussed. In this way, the webpages maintain a similar look and feel but have current offerings that are available at specific physical locations, thereby varying from webpage to webpage.

If the second webpage is associated with the second template, the method advances to 628 where the method includes generating the second webpage based on a third template in the second assignment set. Generating the second webpage includes at 630 where the method includes populating the second webpage with a second set of static content.

At 632, the method includes identifying dynamic content eligible for a third set of dynamic content that is intended to be surfaced on the second webpage and surfacing the third set of dynamic content to the second webpage based on the second assignment set. It will be understood that the third set of dynamic content is different from the first and second sets of dynamic content due to the fact that the sets of dynamic content correspond to offerings at different physical locations.

Next at 634, the method includes distributing the second webpage to the first host device or a second host device. Once the second webpage is distributed to the host device, the second webpage is accessible by end-user computing devices for display and interaction on the devices. In this way, end-users are able to view dynamic content that is specific to a physical location that they are interested in examining.

Method 600 allows different sets of dynamic content (corresponding to different offerings available at physical locations) to be efficiently surfaced on different webpages using templates that enable the content to be presented on the webpages with a similar layout to maintain consistent branding.

Figure 7:
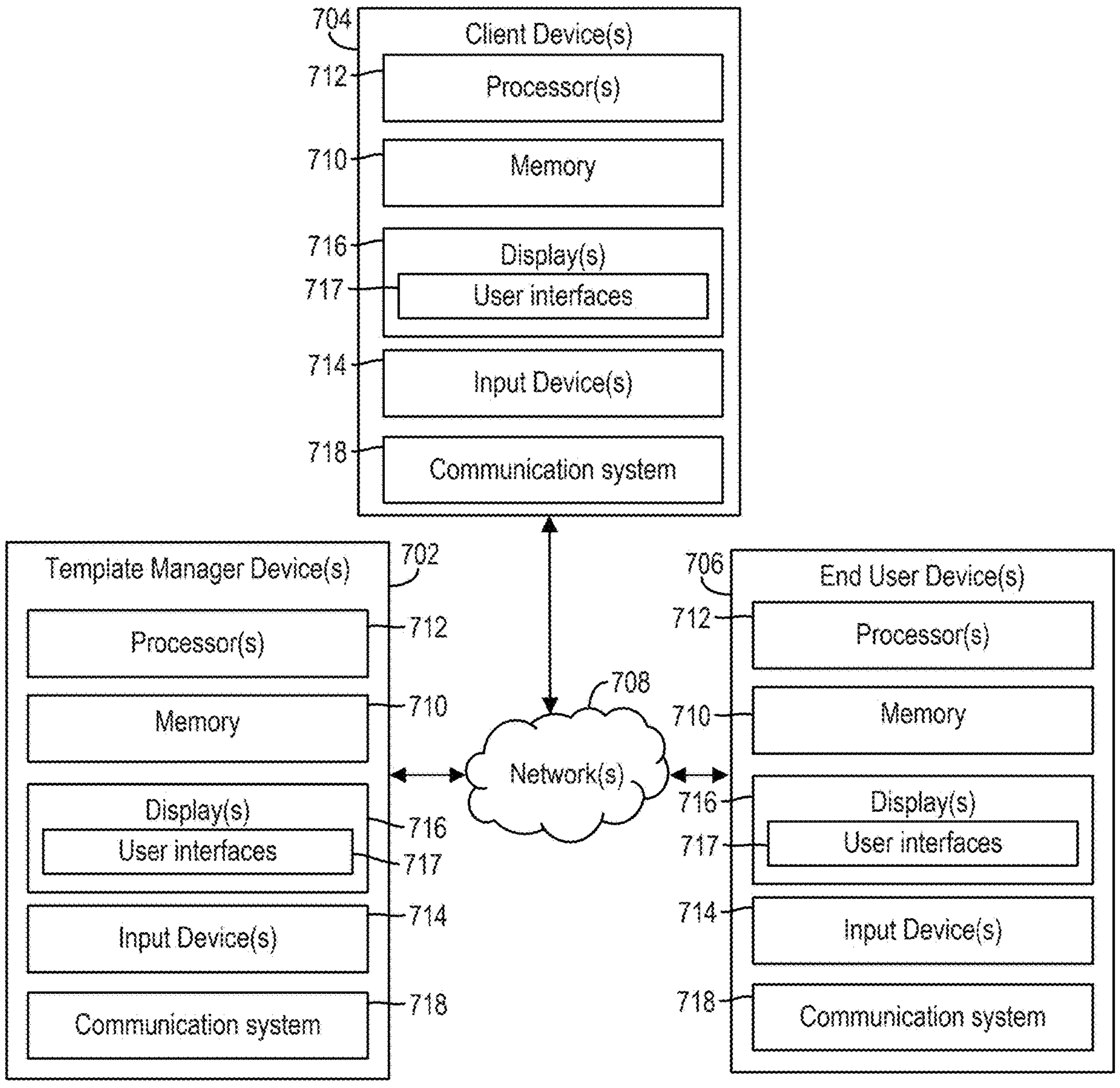
FIG. 7 shows a schematic diagram of client, end user, and administrator computing device used for accessing different aspects of the template management system and webpages generated via the template management system.

FIG. 7 shows an example of devices used to access various features of a template management system, such as any of the previously described template management systems or combinations of the systems. These devices include one or more template management device(s) 702, one or more client device(s) 704, and one or more end-user device(s) 706. These devices are in electronic communication with one another over one or more network(s) 708 (e.g., the Internet). The devices 702, 704, and 706 may each include memory 710 that stores instructions which are executable by a processor 712. The devices 702, 704, and 706 may further include input devices 714 (e.g., keyboards, mice, game controllers, cameras, microphones, touch screens, combinations thereof, and the like). The client device(s) 704 may be used by companies, organization, and the like to generate location based webpage templates, generate dynamic content, and manage aspects of the templates to efficiently craft their brand in a location specific manner.

Additionally, the devices 702, 704, and 706 may each further include display(s) 716 on which user interfaces 717 may be presented. The devices 702, 704, and 706 may each additionally include a communication system 718 that allows the devices to electronically connect to the network 708. It will be appreciated the components in devices may vary from device to device. The communication systems 718 may include wired and/or wireless communication devices compatible with one or more different communication protocols.

The devices 702, 704, and 706 may take the form of a mainframe computer, a server computer, a desktop computer, a laptop computer, a tablet computer, a network computing device, a mobile computing device, a mobile communication device, combinations thereof, and so on.

The template manager device(s) 702 are used by system administrators to access and the platform. The client device(s) 704 are be used by companies, organizations, etc. for brand management. The end-user device(s) 706 are used by individuals to access webpages tailored for specific locations.

Further, the template manager device(s) 702, client device(s) 704, and end-user device(s) 706 may be used to access the platforms, functions, modules, data structures, and the like described herein with regard to FIGS. 1-6B.

The template management systems and methods described herein allow the processing efficiency of the system to be increased by enabling static content and content layouts (e.g., section and content level margins, paddings, alignment, and the like) to be shared by multiple webpages that are grouped under a common location type while allowing dynamic offerings to be presented on webpages on a location by location basis when compared to systems where each webpage (for a specific offering location) is separately managed by a client.

Additionally, the template management system described herein demands specific technological means (in the form of widget level dynamic content eligibility determination) for providing improvements with regard to webpage template management. Specifically, the use of the templates for multiple location specific webpages allows the system to operate differently than it otherwise would through the more efficient use of processing resources when compared to systems that manage location based webpages individually.

The template management system described herein allows static and dynamic content to be efficiently combined and displayed on interrelated webpages using a procedure that demands less client interaction (when compared to systems that are configured to individually managed location-based websites on a location-by-location basis).

Note that the methods included herein can be used with various systems. Likewise, please note the order of the steps is not necessarily demanded to achieve the features and advantages of the example embodiments described herein, but is provided for ease of illustration and description. One or more of the illustrated actions, operations, and/or functions may be repeatedly performed depending on the particular strategy being used.

The invention will be further described in the following paragraphs. In one aspect, a method for webpage template management is provided that comprises generating a first webpage based on a template associated with a grouping of one or more locations; surfacing a first set of eligible dynamic content onto the first webpage based on a set of widgets that control display eligibility through multiple settings that are both included in the template; and distributing the first webpage to a first host device; wherein the first webpage corresponds to a first physical location that is associated with the grouping of one or more locations; and wherein the first set of eligible dynamic content includes one or more offerings that are available at the first physical location. In one example, the method may further comprise, prior to surfacing the first set of eligible dynamic content, identifying content for inclusion in the first set of eligible dynamic content in response to the content being associated with the first physical location and the template including a dynamic content display eligibility widget that corresponds to a type of the content. In another example, generating the first webpage additionally may include populating the first webpage with a set of static content that is included in the template. In another example, the method may further comprise generating a second webpage based on the template; distributing the second webpage to the first host device or a second host device; and surfacing a second set of eligible dynamic content on the second webpage based on the set of widgets that control display eligibility through multiple settings in the template; wherein the second webpage corresponds to a second physical location; wherein the second set of eligible dynamic content corresponds to one or more offerings that are available at the second physical location; wherein the first set of eligible dynamic content differs from the second set of related eligible content; and wherein the second set of eligible dynamic content corresponds to offerings available at the second physical location. In another example, the one or more offerings may include a product offering, a service offering, and/or an event offering. In another example, the method may further comprise controlling instantiation of the first webpage based on a presence of a related page type template in an assignment set, wherein the assignment set includes the template. In another example, the template may be included in an assignment set that is associated with the grouping of one or more locations. In another example, the set of widgets that control display eligibility through the multiple settings may be configured to control a type of dynamic content that is eligible to be surfaced on the first webpage. In another example, the set of widgets that control display eligibility through multiple settings may be configured to dynamically vary content in the first set of eligible dynamic content based on the first physical location and a product item. In another example, the set of widgets that control display eligibility through multiple settings may include filters specific to each offering type that limit types of dynamic content that are eligible for display.

In another aspect, a template management system is provided that comprises a template system server configured to: generate a first webpage based on a template associated with a grouping of one or more locations; surface a first set of eligible dynamic content onto the first webpage based on a set of widgets that control display eligibility through multiple settings that are included in the template; and distribute the first webpage to a first host device; wherein a piece of content is eligible for inclusion in the first set of eligible dynamic content if the piece of content is assigned to a first physical location that corresponds to the first webpage and the template includes a widget for the piece of content; wherein the first physical location is associated with the grouping of one or more locations; and wherein the first set of eligible dynamic content includes offering content that corresponds one or more offerings that are available at the first physical location. In one example, the template system server may be configured to: generate a second webpage based on the template associated with the grouping of the one or more locations; surface a second set of eligible dynamic content on the second webpage based on the set of widgets that control display eligibility through multiple settings that are included in the template; and distribute the second webpage to the first host device or a second host device; wherein a piece of content is eligible for inclusion in the second set of eligible dynamic content if the piece of content is assigned to a second physical location that corresponds to the second webpage and the template includes a slot for the piece of content; and wherein the second physical location is associated with the grouping of the one or more locations. In another example, the one or more offerings may include a product offering, a service offering, and/or an event offering. In yet another example, generating the first webpage may include populating the first webpage with a set of static content that is included in the template. In another example, the template system server may be configured to support varying templates within a set according to either a simple parameter or an arbitrary condition.

In another aspect, a method for webpage template management is provided that comprises generating a first webpage based on a template that is associated with a grouping of one or more locations; identifying content eligible for inclusion in a first set of eligible dynamic content in response to the content corresponding to the grouping of the one or more locations, the template including a slot for the content, and the content being assigned to a physical location that corresponds to the first webpage; surfacing a first set of eligible dynamic content onto the first webpage based on the set of widgets that control display eligibility through multiple settings that are included in the template; and distributing the first webpage to a first host device; wherein the first webpage corresponds to a first physical location that is associated with the grouping of the one or more locations; and wherein the first set of eligible dynamic content includes content that corresponds to one or more offerings that are available at the first physical location. In another example, the method may further comprise generating a second webpage based on the template associated with the grouping of the one or more locations; surfacing a second set of eligible dynamic content on the second webpage based on set of widgets that control display eligibility through multiple settings that is included in the template; and distributing the second webpage to the first host device or a second host device; wherein the second webpage corresponds to a second physical location; wherein the second set of eligible dynamic content includes content that corresponds to one or more offerings that are available at the second physical location; and wherein the one or more offerings available at the first physical location are different from the one or more offerings available at the second physical location. In another example, the one or more offerings available at the first physical location and the one or more offerings available at the second physical location may include a product offering, a service offering, and/or an event offering. In another example, the grouping of the one or more locations may be expressed as a location type; and the template may be included in a set of templates that is associated with the location type. In another example, the set of widgets that control display eligibility through multiple settings may be configured to dynamically vary content in the first set of eligible dynamic content based on the first physical location and a product item; and/or the set of widgets that control display eligibility through multiple settings may include filters specific to each offering type that limit types of dynamic content that are eligible for display.

It will be appreciated that the configurations and routines disclosed herein are exemplary in nature, and that these specific embodiments are not to be considered in a limiting sense, because numerous variations are possible. Thus, the examples described herein are non-limiting.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for webpage template management, comprising:

at a server in a template management system, generating a first webpage based on a template associated with a grouping of one or more locations;

programmatically incorporating one or more pieces of dynamic content into a first set of eligible dynamic content in response to the one or more pieces of dynamic content being associated with a first physical location and the template including a dynamic content display eligibility widget that corresponds to a type of the dynamic content;

surfacing the first set of eligible dynamic content onto the first webpage; and distributing the first webpage to a first host device;

wherein the first webpage corresponds to the first physical location that is associated with the grouping of one or more locations;

wherein the first set of eligible dynamic content includes one or more offerings that are available at the first physical location;

wherein the availability of the one or more offerings at the first physical location is sent to the server via an application programming interface (API); and wherein the dynamic content display eligibility widget includes one or more content filters, one or more settings, and/or one or more display modes.

2. The method of claim 1, wherein the one or more pieces of dynamic content are included in the first set of eligible dynamic content only when the content is associated with the first physical location and the template includes the dynamic content display eligibility widget that corresponds to the type of the dynamic content.

3. The method of claim 1, wherein:

the first set of eligible dynamic content is managed in two layers;

the two layers include a first layer that determines a type of content that is distributed to the first physical location; and the two layers include a second layer that determines if a corresponding widget is present in the template.

4. The method of claim 1, further comprising at a server in a template management system:

generating a second webpage based on the template;

distributing the second webpage to the first host device or a second host device; and surfacing a second set of eligible dynamic content on the second webpage based on a display eligibility and configuration widget that controls display eligibility through multiple settings in the template;

wherein the second webpage corresponds to a second physical location;

wherein the second set of eligible dynamic content corresponds to one or more offerings that are available at the second physical location;

wherein the first set of eligible dynamic content differs from the second set of eligible dynamic content; and wherein the second set of eligible dynamic content corresponds to offerings available at the second physical location.

5. The method of claim 1, wherein the one or more offerings include a product offering, a service offering, and/or an event offering.

6. The method of claim 1, further comprising, at a server in a template management system, controlling instantiation of the first webpage based on a presence of a related page type template in an assignment set, wherein the assignment set includes the template.

7. The method of claim 1, wherein the template is included in an assignment set that is associated with the grouping of one or more locations.

8. The method of claim 1, wherein the dynamic content display eligibility widget that controls display eligibility is configured to control a type of dynamic content that is eligible to be surfaced on the first webpage.

9. The method of claim 8, wherein the dynamic content display eligibility widget that controls display eligibility is configured to dynamically vary content in the first set of eligible dynamic content based on the first physical location and a product item.

10. The method of claim 1, wherein the filter is specific to each offering type that limit types of dynamic content that are eligible for display.

11. A template management system, comprising:

a server configured to:

generate a first webpage based on a first template associated with a grouping of one or more locations;

surface a first set of eligible dynamic content onto the first webpage based on a set of widgets that control display eligibility through multiple settings that are included in the first template;

distribute the first webpage to a first host device; and run an A/B test where the first template and a second template are varied according to a parameter or an arbitrary condition;

wherein a piece of content is eligible for inclusion in the first set of eligible dynamic content if the piece of content is assigned to a first physical location that corresponds to the first webpage and the first template includes a widget for the piece of content;

wherein the first physical location is associated with the grouping of one or more locations;

wherein the first set of eligible dynamic content includes offering content that corresponds one or more offerings that are available at the first physical location; and wherein the availability of the one or more offerings at the first physical location is sent to the server via an application programming interface (API).

12. The template management system of claim 11, wherein the server is configured to:

generate a second webpage based on the first template associated with the grouping of the one or more locations;

surface a second set of eligible dynamic content on the second webpage based on the set of widgets that control display eligibility through multiple settings that are included in the first template; and distribute the second webpage to the first host device or a second host device;

wherein a piece of content is eligible for inclusion in the second set of eligible dynamic content if the piece of content is assigned to a second physical location that corresponds to the second webpage and the first template includes a slot for the piece of content; and wherein the second physical location is associated with the grouping of the one or more locations.

13. The template management system of claim 11, wherein the one or more offerings include a product offering, a service offering, and/or an event offering.

14. The template management system of claim 13, wherein generating the first webpage includes populating the first webpage with a set of static content that is included in the first template.

15. The template management system of claim 11, wherein:

the first template includes one or more template-level display settings, one or more section-level display settings, and one or more widget-level display settings; and the one or more template-level display settings, the one or more section-level display settings, and the one or more widget-level display settings control what type of dynamic content is eligible to appear on the first webpage.

16. A method for webpage template management, comprising:

at a server in a template management system, generating a first webpage based on a template that is associated with a grouping of one or more locations;

identifying content eligible for inclusion in a first set of eligible dynamic content in response to the content corresponding to the grouping of the one or more locations, the template including a dynamic content display eligibility widget, and the content being assigned to a physical location that corresponds to the first webpage;

surfacing the first set of eligible dynamic content onto the first webpage;

distributing the first webpage to a first host device;

updating the template via:

editing and/or removing one or more dynamic content display eligibility widgets included in the template in response to client input; and deleting, moving, and/or editing a section of the template; and surfacing a second set of eligible dynamic content based on the updated template;

wherein the second set of eligible dynamic content is different than the first set of eligible dynamic content;

wherein the first webpage corresponds to a first physical location that is associated with the grouping of the one or more locations;

wherein the first set of eligible dynamic content includes content that corresponds to one or more offerings that are available at the first physical location;

wherein the availability of the one or more offerings at the first physical location is sent to the server via an application programming interface (API).

17. The method of claim 16, further comprising, at the server:

generating a second webpage based on the template associated with the grouping of the one or more locations;

surfacing a third set of eligible dynamic content on the second webpage based on a set of widgets that control display eligibility through multiple settings that is included in the template; and distributing the second webpage to the first host device or a second host device;

wherein the second webpage corresponds to a second physical location;

wherein the third set of eligible dynamic content includes content that corresponds to one or more offerings that are available at the second physical location; and wherein the one or more offerings available at the first physical location are different from the one or more offerings available at the second physical location.

18. The method of claim 17, wherein:

the set of widgets that control display eligibility through multiple settings is configured to dynamically vary content in the first set of eligible dynamic content based on the first physical location and a product item; and/or the set of widgets that control display eligibility through multiple settings includes filters specific to each offering type that limit types of dynamic content that are eligible for display.

19. The method of claim 16, further comprising at the server programmatically updating the first set of eligible dynamic content to reflect a current availability of offerings at the first physical location.

20. The method of claim 19, wherein:

the grouping of the one or more locations is expressed as a location type;

the template is included in a set of templates that is associated with the location type; and the location type is programmatically determined via an integration with a source data system of the client.

* * * * *